United States Patent [19]

Awaji et al.

[11] Patent Number: 5,082,598

[45] Date of Patent: * Jan. 21, 1992

[54] RESIN COMPOSITION OF HIGH STORAGE STABILITY

[75] Inventors: Toshio Awaji, Kawanishi; Kenichi Ueda; Daisuke Atobe, both of Suita, all of Japan

[73] Assignee: Nippon Shokubai Kagaku Kogyo Co., Ltd., Osaka, Japan

[ * ] Notice: The portion of the term of this patent subsequent to Jun. 6, 2006 has been disclaimed.

[21] Appl. No.: 335,772

[22] Filed: May 8, 1989

Related U.S. Application Data

[62] Division of Ser. No. 100,210, Sep. 23, 1987, Pat. No. 4,837,280.

[30] Foreign Application Priority Data

Sep. 26, 1986 [JP] Japan ................................ 61-226198
Sep. 26, 1986 [JP] Japan ................................ 61-226199

[51] Int. Cl.⁵ ...................... C08G 12/44; C08G 59/17; C08K 5/16; C08K 5.09
[52] U.S. Cl. .................................... 525/518; 524/201; 524/723; 525/923; 526/118; 526/146; 526/273; 526/288; 526/312
[58] Field of Search ............... 525/502, 518, 531, 923; 526/118, 146, 273, 288, 312

[56] References Cited

U.S. PATENT DOCUMENTS

| | | | |
|---|---|---|---|
| 3,956,235 | 11/1976 | Pasternack | 523/459 |
| 4,128,609 | 12/1978 | Awaji | 525/531 |
| 4,413,105 | 11/1983 | Koenig | 525/524 |

FOREIGN PATENT DOCUMENTS 12618 1/1988 Japan .
99220 4/1988 Japan .

*Primary Examiner*—Marion E. McCamish
*Assistant Examiner*—Arthur H. Koeckert
*Attorney, Agent, or Firm*—Omri M. Behr

[57] ABSTRACT

A thermosetting resin composition of highly satisfactory storage stability comprises 100 parts by weight of a thermosetting resin composition, 0.0001 to 2.0 parts by weight of a thiuram compound possessing at least one atomic group represented by the following formula:

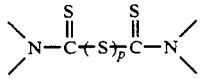

wherein p stands for an integer in the range of 1 to 8, and 0.00001 to 0.1 part by weight (as copper metal) of a copper-containing compound.

4 Claims, No Drawings

RESIN COMPOSITION OF HIGH STORAGE STABILITY

This application is a division of application Ser. No. 07/100,210, filed Sept. 23, 1987, now U.S. Pat. No. 4,837,280.

BACKGROUND OF THE INVENTION

1. Field of the Invention

This invention relates to a resin composition with high storage stability. More particularly, it relates to a method for imparting storage stability to a resin composition which excels in formability as in terms of curability and workability and produces a cured article excelling in stability to endure elevated temperatures and in mechanical strength.

2Description of the Prior Art

As resins possessing high stability at elevated temperatures, various heat-resistant resins are cited which are represented by polyimide resins and polyamideimide resins. These heat-resistant resins, however, have important problems regarding formability as because they have high melting points and, therefore, necessitate use of a high temperature and a high pressure for molding, because they require to stand at a high temperature under a high pressure for a long time for curing, and because they require to be used as dissolved in special high-boiling solvents and, therefore, entail a step for the removal of the solvents by a protracted standing at an elevated temperature under application of pressure or under a vacuum. It is, therefore, extremely difficult to produce large formed articles from these heat-resistant resins or to produce formed articles of these resins continuously as by pultrusion molding or extrusion molding.

As resins excelling in formability in terms of curability, workability, etc., radical polymerization type resins such as epoxy (meth)acrylates derived from polyvalent phenol type epoxy resins such as bisphenol type epoxy resins or novolak type resins and (meth)acrylic acid or unsaturated polyesters have been known in the art. Generally, these resins are widely used in the form of vinyl ester resins or unsaturated polyester resins having incorporated therein a radically polymerizable cross-linking agent such as styrene. These resins, however, are not necessarily quite satisfactory in terms of thermal stability at elevated temperatures. This deficiency in thermal stability constitutes a serious hindrance to the development of applications for the resins. In the circumstances, the desirability of developing a resin excellent in thermal stability has been commanding the recognition of the industry.

We continued numerous studies for the purpose of developing a resin which is capable of producing cured articles of high stability at elevated temperatures without impairing the outstanding formability as in curability and workability and the high mechanical strength inherent in the radically polymerization resin. We have consequently found that a resin composition comprising (A) an unsaturated ester obtained by the reaction of an epoxy compound possessing at least two epoxy groups in the molecular unit thereof with an unsaturated monobasic acid and optionally a polybasic acid and/or (B) an unsaturated ester obtained by the reaction of a compound possessing at least two phenolic hydroxyl groups in the molecular unit thereof with a compound represented by the formula (1):

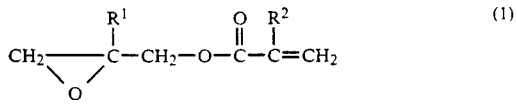

wherein $R^1$ and $R^2$ independently stand for hydrogen atom or methyl group, and possessing an epoxy group and a radically polymerizable unsaturated bond in the molecular unit thereof, (C) a compound possessing at least one maleimide group in the molecular unit thereof, and optionally (D) a polymerizable cross-linking agent meets the purpose mentioned above.(Japanese Patent Application SH061(1986)-247,617)

Indeed this resin composition manifests the outstanding properties mentioned above without any problem so long as it is put to use within a relatively short period of time after the formulation thereof. When this resin composition is kept in protracted storage, however, there is entailed a disadvantage that even in the absence of a polymerization initiator, the composition suffers from a conspicuous increase of viscosity or undergoes gelation at room temperature and becomes hardly workable.

We further continued various studies for the purpose of developing a resin capable of producing cured articles of high stability at elevated temperatures without any sacrifice of the outstanding formability such as curability and workability and the high mechanical property inherent in the radical polymerization type resin. We have consequently found that a vinyl ester resin composition comprising (A') an unsaturated ester compound represented by the formula (2):

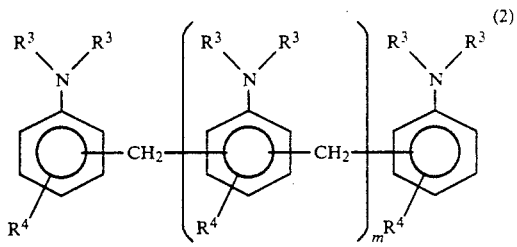

wherein $R^3$'s are independently selected from the group consisting of

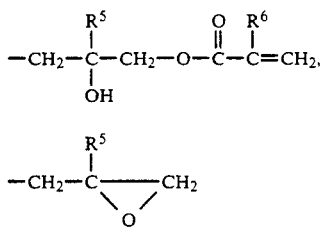

wherein $R^5$ and $R^6$ independently stand for hydrogen atom or methyl group, and hydrogen atom, at least one of the $R^3$'s stand for

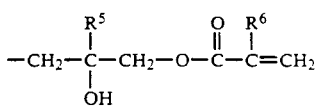

wherein $R^5$ and $R^6$ have the same meanings as defined above, $R^4$'s stand for one member selected from the group consisting of hydrogen atom, halogen atoms, methoxy group, and alkyl groups of 1 to 5 carbon atoms, and m stands for 0 or an integer in the range of 1 to 10, and/or (B') an unsaturated ester compound represented by the formula (3):

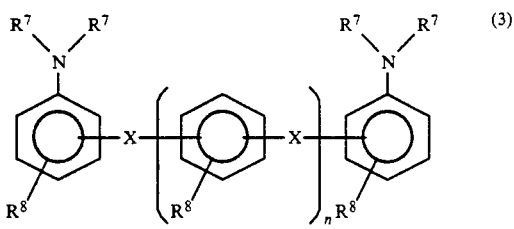

wherein $R^7$'s are independently selected from the group consisting of

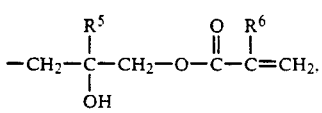

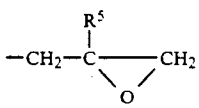

wherein $R^5$ and $R^6$ have the same meanings as defined above, and hydrogen atom, at least one of $R^7$'s stands for

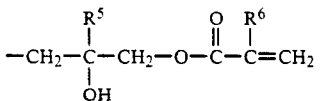

wherein $R^5$ and $R^6$ have the same meanings as defined above, $R^8$'s stand for at least one member selected from the group consisting of hydrogen atom, halogen atoms, methoxy group, and alkyl groups of 1 to 5 carbon atoms, and n stands for 0 or an integer in the range of 1 to 10, providing that X stands for a divalent organic group selected from the group consisting of

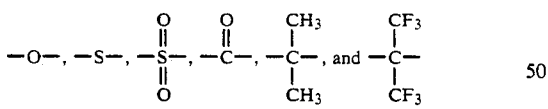

wherein n is O or X's stand for divalent organic groups independently selected from the group consisting of

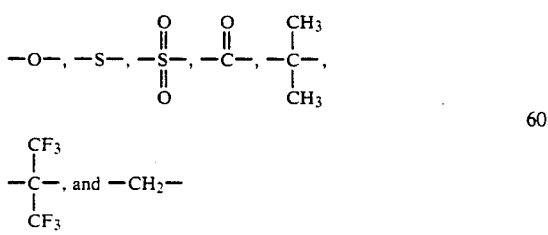

where n is an integer in the range of 1 to 10, and (C') a polymerizable cross-linking agent meets the purpose mentioned above (Japanese Patent Application SHO 61(1986)-75,420, SHO 61(1986)-131,767, and SHO 61(1986)-156,132).

This resin composition manifests the outstanding properties mentioned above without any trouble so long as it is put to use within a short span of time after the preparation thereof. When this resin composition is kept in protracted storage, however, there is encountered a disadvantage that even in the absence of a polymerization initiator, the composition suffers from a remarkable increase of viscosity or undergoes gelation at room temperature and becomes hardly workable.

A method for improving, by the addition of a thiuram compound, the storage stability of a thermosetting resin obtained by dissolving the reaction product of an epoxy resin with an α, β-ethylenic monocarboxylic acid in a polymerizing olefinic compound has been known to the art (U.S. Pat. No. 4,129,609). By the addition of the thiuram compound, however, the aforementioned thermosetting resin does not acquire any satisfactory storage stability.

An object of the present invention, therefore, is to provide a resin composition with highly satisfactory storage stability.

Another object of this invention is to provide a method for imparting storage stability to a resin composition which excels in formability and produces cured articles excelling in stability at elevated temperatures and in mechanical strength.

SUMMARY OF THE INVENTION

The objects described above are accomplished by a thermosetting resin composition of highly satisfactory storage stability, comprising:
(I) 100 parts by weight of one thermosetting resin composition selected from the group consisting of
  (i) a thermosetting resin composition comprising:
    (A) 30 to 90% by weight of at least one unsaturated ester compound selected from the group consisting of
      (a) an unsaturated ester compound obtained by the reaction of an epoxy compound possessing at least two epoxy groups in the molecular unit thereof with an unsaturated monobasic acid and optionally polybasic acid and
      (b) an unsaturated ester compound obtained by the reaction of a compound possessing at least two phenolic hydroxyl groups in the molecular unit thereof with a compound represented by the formula (1):

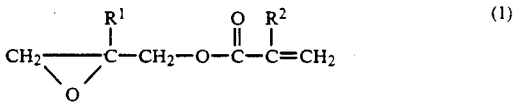

wherein $R^1$ and $R^2$ independently stand for a hydrogen atom or a methyl group, and possessing an epoxy group and a radically polymerizable unsaturated bond in the molecular unit thereof,
    (B) 3 to 40% by weight of a compound possessing at least one maleimide group in the molecular unit thereof, and
    (C) 0 to 67% by weight of a polymerizable cross-linking agent, providing that the total of the components A, B, and C is 100% by weight, and
  (ii) a thermosetting resin composition comprising:

(A') 30 to 95% by weight of at least one unsaturated ester compound selected from the group consisting of
(a') an unsaturated ester compound represented by the general formula (2):

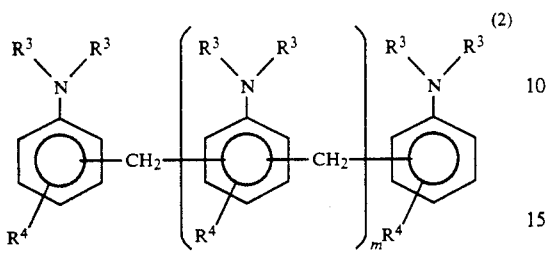

wherein $R^3$'s are independently selected from the group consisting of

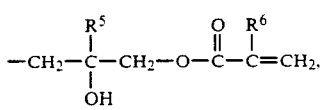

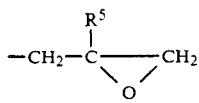

wherein $R^5$ and $R^6$ independently stand for hydrogen atom or methyl group, and hydrogen atom, at least one of $R^3$'s stands for

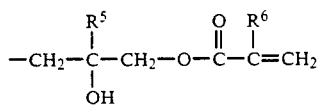

wherein $R^5$ and $R^6$ have the same meanings as defined above, $R^4$'s stand for at least one member selected from the group consisting of hydrogen atom, halogen atoms, methoxy group, and alkyl groups of 1 to 5 carbon atoms, and m stands for 0 or an integer in the range of 1 to 10, and
(b') an unsaturated ester compound represented by the formula (3):

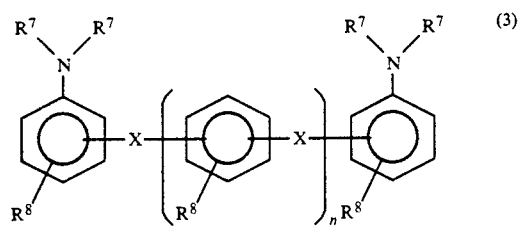

wherein $R^7$'s independently selected from the group consisting of

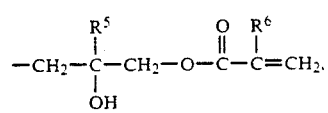

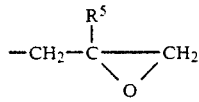

wherein $R^5$ and $R^6$ have the same meanings as defined above, and a hydrogen atom, at least one of $R^7$'s stands for

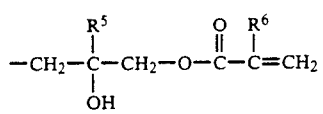

wherein $R^5$ and $R^6$ have the same meanings as defined above, $R^8$'s stand for at least one member selected from the group consisting of hydrogen atom, halogen atoms, methoxy group, and alkyl groups of 1 to 5 carbon atoms, and n stands for 0 or an integer in the range of 1 to 10, providing that X stands for a divalent organic group selected from the group consisting of

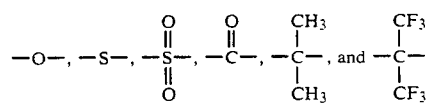

where n is O, or X's stand for divalent organic groups independently selected from the group consisting of

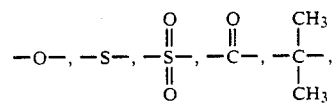

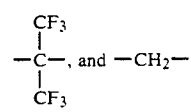

where X is an integer in the range of 1 to 10, and
(C') 70 to 5% by weight of a polymerizable crosslinking agent,
(II) 0.0001 to 2.0 parts by weight of a thiuram compound possessing at least one atomic group represented by the formula (4):

wherein p stands for an integer in the range of 1 to 8, in the molecular unit thereof, and
(III) 0.00001 to 0.1 part by weight (as copper metal) of a copper-containing compound.

The objects described above are accomplished by a method for imparting storage stability to a resin composition, which comprises adding to 100 parts by weight of (I) a resin composition 0.0001 to 2.0 parts by weight of (II) a thiuram compound and 0.00001 to 0.1 part by weight of (III) a copper-containing compound (as copper metal).

EXPLANATION OF PREFERRED EMBODIMENT

The (I) thermosetting resin composition to which high storage stability is to be imparted by the present invention is one thermosetting resin composition selected from the group consisting of (i) a thermosetting resin composition comprising (A) at least one unsaturated ester compound selected from the group consisting of (a) an unsaturated ester compound obtained by the reaction of an epoxy compound possessing at least two epoxy groups in the molecular unit thereof with an unsaturated monobasic acid and optionally further with a polybasic acid and (b) an unsaturated ester compound obtained by the reaction of a compound possessing at least two phenolic hydroxyl groups in the molecular unit thereof with a compound represented by the formula (1) and possessing an epoxy group and a radically polymerizable unsaturated bond in the molecular unit thereof, (B) a compound possessing at least one maleimide group in the molecular unit thereof, and optionally (C) a polymerizable cross-linking agent and (ii) a thermosetting resin composition comprising (A') at least one unsaturated ester compound. selected from the group consisting of (a') an unsaturated ester compound represented by the formula (2) and (b') an unsaturated ester compound represented by the general formula (3) and (c') a polymerizable cross-linking agent.

Examples of the epoxy compound possessing at least two epoxy groups in the molecular unit thereof and used for the preparation of (a) the unsaturated ester compound in the present invention (hereinafter referred to simply as "polyfunctional epoxy compound") include bisphenol type epoxy resins represented by the formula (5):

resins such as triglycidyl-p-aminophenol, triglycidyl-m-aminophenol, N-tetraglycidyl-diaminodiphenyl methane, and polyglycidyl m-xylylene diamine; isocyanuric acid type epoxy resins such as triglycidyl isocyanurate; tetrahydroxyphenyl ethane type epoxy resins; hydantoin type epoxy resins; and alicyclic epoxy resins. One member or a mixture of two or more members suitably selected from the group of epoxy resins enumerated above can be used.

As examples of the epoxy resins available in the market, there can be cited products of Ciba-Geigy marketed under trademark designations of Araldite GY250, Araldite GY260, Araldite 6071, Araldite 8011, EPN1138, EPN1139, ECN1235, ECN1273, ECN1280, ECN1299, Araldite MY720; products of Shell Chemical Co. marketed under trademark designations of Epikote 828, Epikote 1001, and Epikote 1004; products of Dow Chemical Co. marketed under trademark desigantion of D.E.R. 330, D.E.R. 331 D.E.R.662, D.E.R. 542, D.E.N. 431, and D.E.N. 438; products of Toto Kasei marketed under trademark designations of Epototo YD-127, Epototo YD-011, Epototo YDB-400, Epototo YDB-500, Epototo YDF-170, Epototo YDF-2001, YDCN-701, YDCN-702, YDCN-703, YDCN-704, YDPN-638, YDPN-601, YDPN-602, YDM-120, YH-434, and ST-110. Further, glycidyl ethers resulting from the condensation of unsaturated aldehydes with phenols, adducts of polyvalent phenol compounds to epoxy compounds possessing at least two epoxy groups on the average in the molecular unit thereof, and glycidyl ether compounds resulting from the copolycondensation of polyvalent phenols with monovalent phenols are other examples of the epoxy resins. The polyfunctional epoxy compound to be used for the present invention is not limited to these epoxy compounds enumerated above. At any rate, the epoxy resin compound has only to contain at least two epoxy groups on the average in

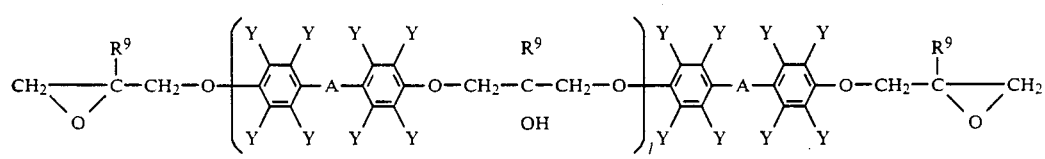

(5)

wherein A stands for an alkylene group of 1 to 4 carbon atoms, $SO_2$, S, or O, $R^9$ for hydrogen atom or methyl group, Y for hydrogen atom or halogen atom, and ( for 0 or an integer in the range of 1 to 15; novolak type epoxy resins represented by the formula (6):

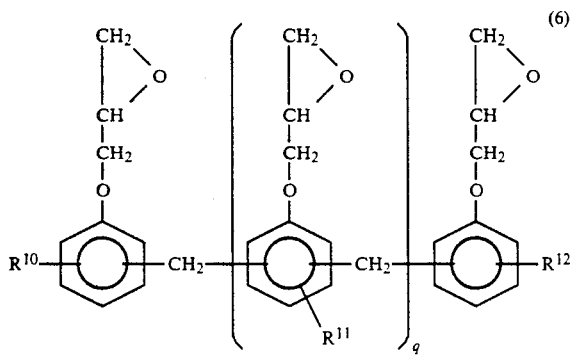

(6)

wherein $R^{10}$, $R^{11}$, and $R^{12}$ independently stand for hydrogen atom or an alkyl group and q stands for an integer in the range of 1 to 15; glycidylamine type epoxy the molecualr unit thereof. One such epoxy compound or a combination of two or more such epoxy compounds suitably selected can be used.

Examples of the unsaturated monobasic acid used for the reaction with the polyfunctional epoxy resin include acrylic acid, methacrylic acid, crotonic acid, cinnamic acid, oleic acid, linolic acid, linoleic acid, and half-esterification products of such unsaturated dibasic acids as maleic acid and fumaric acid. Of course, one member or a combination of two or more memoers suitably selected from the group of acids enumerated above can be used.

Examples of the polybasic acid to be used optionally in the present invention include unsaturated acids such as maleic acid, fumaric acid, itaconic acid, and citraconic acid, saturated acids such as phthalic acid, isophthalic acid, terephthalic acid, succinic acid, adipic acid, sebacic acid, trimellitic acid, and pyromellitic acid, and polybutadiene containing carboxyl groups one each at the opposite terminals thereof, and butadiene-acrylonitrile copolymer containing carboxyl groups one each at the opposite terminals thereof. One member or a combination of two or more members suitably selected from the group of polybasic acids can be used.

In the production of (a) the unsaturated ester compound by the reaction of the polyfunctional epoxy compound with the unsaturated monobasic acid and optionally further with the polybasic acid, these reactants are used in such amounts that the total of carboxyl groups contained in the unsaturated monobasic acid and in the optioanlly used polybasic acid falls in the range of 0.7 to 1.3 mols, preferably 0.8 to 1.2 mols, based on one mol of epoxy groups contained in the polyfunctional epoxy compound. Where the polybasic acid is used in addition to the unsaturated monobasic acid, the number of mols of the polybasic acid to be used may be less the equivalent number of mols of the unsaturated monobasic acid to maintain outstanding mechanical strength.

The esterification reaction mentioned above is carried out in an inert solvent or in the absence of a solvent at a temperature in the range of 60° to 150° C., preferably 70° C. to 130° C. preferably in the presence of air. For the purpose of precluding the possible gelation due to the polymerization during the course of the reaction, it is desirable to use any of the conventional polymerization inhibitors such as, for example, hydroquinones like methyl hydroquinone and hydroquinone; and benzoquinones like p-benzoquinone and p-toluqinone.

For the purpose of decreasing the reaction time, it is desirable to use an esterification catalyst. Examples of the esterification catalyst include tertiary amines such as N,N-dimethyl aniline, pyridine, triethyl amine, and hexamethylene diamine, and hydrochlorides and hydrobromides thereof; quaternary ammonium salts such as tetramethyl ammonium chloride and triethylbenzyl ammonium chloride; sulfonic acids such as paratoluenesulfonic acid; sulfoxides such as dimethyl sulfoxide and methyl sulfoxide; sulfonium salts such as trimethyl sulfonium chloride and dimethyl sulfonium chloride; phosphines such as triphenyl phosphine and tri-n-butyl phosphine; and metal halides such as lithium chloride, lithium bromide, stannous chloride, and zinc chloride.

As an inert solvent, toluene or xylene may be used. The solvent must be removed form the reaction system after the reaction. Particularly when a polymerizable cross-linking agent which is in a liquid state at normal room temperature is used in the final composition, therefore, it is advantageous to divert this polymerizable cross-linking agent as a solvent.

As examples of the compound possessing at least two phenolic hydroxyl groups in the molecular unit thereof and used for the production of (b) the unsaturated ester compound, (hereinafter referred to simply as "polyfunctional phenol compound"), there can be cited diphenol methane (bisphenol F), diphenol ethane, diphenol propane (bisphenol A), diphenol sulfone (bisphenol S), 4,4'-thiobisphenol, 4,4'-sulfinyl bisphenol, 2,3'-oxybisphenol, bisphenol A tetrachloride, bisphenol A tetrabromide, 1,1-bis-(4-hydroxyphenyl)-1-phenyl ethane, 1,1-bis-(4-hydroxyphenyl)-1,1-dimethyl methane, phenol novolak, brominated phenol novolak, cresol novolak, brominated cresol novolak, resorcin novolak, brominated resorcin novolak, hydroquinone, (iso)-cyanuric acid, and methyl resorcin. Further, condensates of unsaturated aldehydes and phenols, adducts of polyphenol compounds to epoxy compounds, and copolycondensates of polyphenol compounds with monovalent phenol compounds are other examples. The polyfunctional phenol compound to be used for the present invention is not limited to those enumerated above. It is required only to be a compund possessing at least two phenolic hydroxyl groups in the molecular unit thereof. One member or a combination of two or more members suitably selected from the group of compounds enumerated above can be used.

The compound possessing an epoxy group and a radically polymerizable unsaturated bond and used for the reaction with the polyfunctional phenol compound (hereinafter referred to simply as "unsaturated glycidyl ester compound") is represented by the aforementioned formula (1). Examples of the unsaturated ester compound include glycidyl methacrylate, glycidyl acrylate, 2-methyl glycidyl methacrylate, and 2-methyl glycidyl acrylate. One member or a combination of two or more members suitably selected drom these compounds can be used.

The production of (b) the unsaturated ester compound by the reaction of the polyfunctional phenol compound with the unsaturated glycidyl ester compound can be effected by following the conventional ring-opening addition reaction. For example, this reaction is carried out by combining the two reactants in amounts such that the amount of the unsaturated glycidyl ester compound falls in the range of 0.5 to 1.5 equivalent weights, preferably 0.8 to 1.2 equivalent weights, per one equivalent weight of the phenolic hydroxyl group contained in the polyfunctional phenol compound and heating the resultant mixture in an inert solvent or in the absence of a solvent at a temperature in the range of 30° to 150° C., preferably 50° to 130° C., preferably in the presence of air. For the purpose of precluding the gelation due to the possible polymerization in the course of the reaction, it is desirable to use the conventional polymerization inhibitor. Examples of the polymerization inhibitor include hydroquinones such as methyl hydroquinone and hydroquinone and benzoquinones such as p-benzoquinone and p-toluquinone.

Further, for the purpose of decreasing the reaction time, it is permissible to use a ring-opening addition reaction catalyst Examples of the conventional ring-opening addition reaction catalyst include tertiary amines such as triethyl amine and triethylene diamine; amines such as dimethyl aminoethanol and N-methyl morpholine; quaternary ammonium salts such as triethyl benzyl ammonium chloride and trimethyl dodecyl ammonium chloride; imidazoles such as 2-ethyl imidazole and 2-methyl-4-ethyl imidazole; organic tertiary phosphines such as triphenyl phosphine and tributyl phosphine; tetraphenyl boron salts such as triphenyl phosphine tetraphenyl borate and triethyl amine tetraphenyl borate; and metal halogenides such as zinc chloride and tin chloride.

As an inert solvent, there can be used toluene, xylene, or dimethyl formamide, for example. The solvent thus used must be removed from the reaction system after the reaction. Particularly where a polymerizable cross-linking agent which is in a liquid state at normal room temperature is additionally used, it is advantageous to convert this polymerizable cross-linking agent as a solvent.

Examples of (B) the compound possessing at least one maleimide group in the molecular unit thereof and used in the present invention (hereinafter referred to simply as "maleimide compound (B)") include monomaleimide compounds such as N-methyl maleimide, N-ethyl maleimide, N-isopropyl maleimide, N-butyl maleimide, N-cyclohexyl maleimide, N-phenyl maleimide, N-o-methylphenyl maleimide, N-m-methylphenyl maleimide, N-p-methylphenyl maleimide,N-o-hydroxyphenyl maleimide, N-m.hydroxyphenyl maleimide, N-p-hydroxyphenyl maleimide, N-o-methoxyphenyl maleimide, N-m-methoxyphenyl maleimide, N-p-methoxyphenyl maleimide, N-o-carboxyphenyl maleimide, N-p-carboxylphenyl maleimide, N-o-chlorophenyl maleimide, N-m-chlorophenyl maleimide, N-p-chlorophenyl maleimide; and polymaleimide compounds such as N,N'-ethylene dimaleimide, N,N'-hexamethylene dimaleimide, N,N'-dodecamethylene dimaleimide, N,N'-m-phenylene dimaleimide, N,N'-p-phenylene dimaleimide, N,N'-(oxy-di-p-phenylene) dimaleimide, N,N'-(methylene- di-p-phenylene) dimaleimide, N,N'-2,4-tolylene dimaleimide, N,N'-2,6-tolylene dimaleimide, N,N'-m-xylylene dimaleimide, N,N'-p-xylylene dimaleimide, N,N'-oxydipropylene dimaleimide, ethylene dioxy-bis-N-propyl maleimide, and oxy-bis-N-ethyl maleimide. One member or a combination of two or more members suitably selected from this group can be used.

Among other maleimide compounds cited above, monomaleimide compounds prove to be particularly desirable in respect that they exhibit high compatibility to (a) the unsaturated ester compound and (b) the unsaturated ester compound and excellent compatibility to the composition made up to (a) the unsaturated ester compund, (b) the unsaturated ester compound, and (C) the polymerizable cross-linking agent as well.

Examples of (C) the polymerizable cross-linking agent which is used, when necessary, in the present invention include styrene and styrene derivatives such as -methyl styrene, p-methyl styrene, t-butyl styrene, vinyl toluene, and divinyl benzene; (meth)acrylic ester monomers such as methyl methacrylate, 2-ethylhexyl (meth)acrylate, cyclohexyl (meth)acrylate, tricylodecenyl (meth)acrylate, and 2-hydroxyethyl (meth)acrylate; (meth)acrylates of polyhydric alcohols such as trimethylol propane tri(meth)acrylate, diethylene glycol di(meth)acrylate, 1,4-butane diol di(meth)acrylate, tris(2-hydroxyethyl) isocyanuric acid (meth)acrylic esters, and di(meth)acrylate of 2,2-bis[4-(2-hydroxyethoxy)-phenyl]propane; and allyl compounds such as diallyl phthalate, diallyl isophthalate, diallyl terephthalate, triallyl isocyanurate, and triallyl cyanurate which have been conventionally used for unsaturated polyeter resins and vinyl ester resins in general. One member or a combination of two or more members suitably selected from the group can be used.

The mixing ratio of (a) the unsaturated ester compound and/or (b) the unsaturated ester compound, (B) the maleimide compound, and (C) the polymerizable cross-linking agent is desired from the standpoint of mechanical properties and thermal stability to be such that the proportion of (A) (a) the unsaturated ester compound and/or (b) the unsaturated ester compound is in the range of 30 to 90% by weight, preferably 40 to 80% by weight, the proportion of (B) the maleimide compound in the range of 3 to 40% by weight, preferably 5 to 30 % by weight, and the proportion of (C) the polymerizable cross-linking agent in the range of 0 to 67% by weight, preferably 0 to 55% by weight providing that the total of (A), (B), and (C) is 100% by weight.

(a') The unsaturated ester compound or (b') the unsaturated ester compound to be used as a component of (ii) the thermosetting resin composition to which the storage stability aimed at by the present invention is to be imparted can be produced as follows, for example.

The first method available for the production comprises causing an aromatic polyamine (s) represented by the formula (2a):

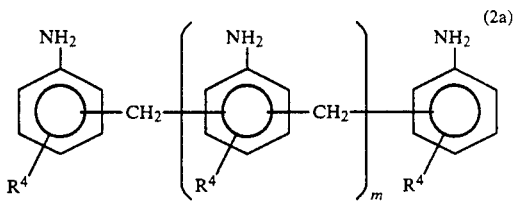

wherein $R^4$ stands for at least one member selected from the group consisting of hydrogen atom, halogen atoms, methoxy group, and alkyl groups of 1 to 5 carbon atoms and m for O or an integer in the range of 1 to 10, or an aromatic diamine (t) represented by the formula (3a):

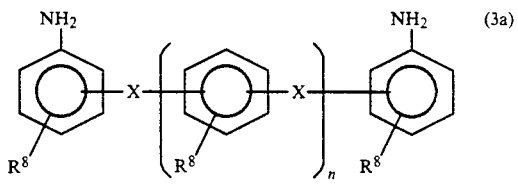

wherein $R^8$ stands for at least one member selected from the group consisting of hydrogen atom, halogen atoms, methoxy group, and alkyl groups of 1 to 5 carbon atoms, and n for O or an integer in the range of 1 to 10, providing that X is a divalent organic group selected from the group consisting of

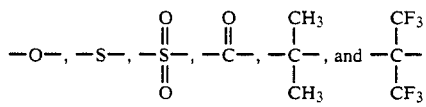

wherein n is O or X's stand for divalent organic groups independently selected from the group consisting of

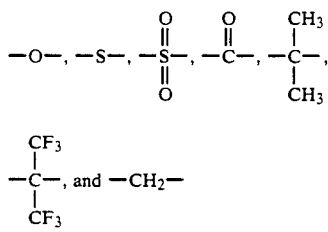

where n is an integer in the range of 1 to 10, to react a compound (u) possessing an epoxy group and a radically polymerizable unsaturated bond in the molecular unit thereof and represented by the formula (7):

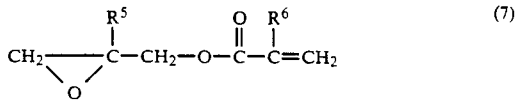

wherein $R^5$ and $R^6$ independently stand for hydrogen atom or methyl group.

The aromatic polyamine (s) is a compound to be represented by the aforementioned formula (2a). It can be produced, for example, by neutralizing an aniline derivative with hydrochloric acid thereby forming an aniline derivative hydrochloride solution and causing the hydrochloride solution to be reacted upon by formaldehyde in such a manner that the proportion of the formaldehyde falls in the range of 02.5 to 1.0 mol per mol of the aniline derivative. As an aniline derivative, one member of a combination of two or more members suitably selected from the group consisting of aniline, p-(m- or o-) chloroaniline, p-(m- or o-) toluidine, p-(m- or o-) ethyl aniline, p-(m- or o-) iso-propyl aniline, p-(m- or o-) n-propyl aniline, and p-(m- or o-) methoxy aniline. The poly(phenylene methylene) polyamine obtained by the reaction of aniline with formaldehyde is now manufactured as a raw material for polyurethane on a commercial scale. A commerical product of Mitsui-Toatsu Chemicals Inc. marketed under product code of MDA-220 or MDA-150 can be used in its unaltered form as an aromatic polyamine (s) in the present invention.

The aromatic diamine (t) is a compound represented by the aforementioned formula (3a). Examples of the aromatic diamine (t) are 4,4'-diaminodiphenyl sulfide, 4,4'-diaminodiphenyl sulfone, 3,3'-diaminodiphenyl sulfone, 3,4'-diaminodiphenyl ether, 4,4'-diaminodiphenyl ether, 2,2-bis(4-aminophenyl) propane, 2,2-bis(4-aminophenyl) hexafluoropropane, 1,3-bis(4-aminophenoxy) benzene, 1,4-bis(4-aminophenoxy) benzene, 1,3-bis(3-aminophenoxy) benzene, 2,2-bis [4-(4-aminophenoxy)phenyl]propane, bis[4-(4-aminophenoxy)-phenyl]sulfone, 1-(p-aminobenzoyl)-4-(p-aminobenzyl)-benzene, 1-(p-aminobenzoyl)-4-(m-aminobenzyl) benzene, 1-(m-aminobenzoyl)-4-(m-aminobenzyl) benzene, 1,4-bis(m-aminobenzoyl) benzene, 1,4-bis(p-aminobenzoyl) benzene, 1,3-bis(m-aminobenzyl) benzene, 4,4'-bis (m-aminobenzoyl) diphenyl methane, 4,4'-bis(p-aminobenzoyl) diphenyl methane, 4,4'-bis(m-aminobenzyl) diphenyl methane, and the products of substitution of the aromatic hydrogen of the aforementioned compounds with a halogen atom, a methoxy group, or an alkyl group of 1 to 5 carbon atoms. One member or a combination of two or more members suitably selected from the group cited above can be used.

The compound (u) possesses an epoxy group and a radically polymerizable unsaturated bond in the molecular unit thereof and represented by the aforementioned formula (7). Examples of this compound (u) include glycidyl methacrylate, glycidyl acrylate, 2-methyl glycidyl methacrylate, and 2-methyl glycidyl acrylate One member or a combinatin of two or more members suitably selected from the group mentioned above can be used.

In the production of (a') the unsaturated ester compound or (b') the unsaturated ester compound by the ring-opening addition reaction of (s) the aromatic polyamine or (t) aromatic diamine with (u) the compoud, (s) the aromatic polyamine or (t) the aromatic diamine and (s) the compound are combined in a ratio such that the proportion of (u) the compound falls in the range of 0.2 to 1.5 equivalent weight, preferably 0.3 to 1.0 equivalent weight, per equivalent weight of the hydrogen atoms directly bonded to the nitrogen atoms contained in (u) the aromatic polyamine or (t) the aromatic diamine and the resultant mixture is heated in an inert solvent or in the absence of a solvent at a temperature in the range of 30° to 150° C., preferably 50° to 130° C., preferably in the presence of air, to effect a reaction.

For the purpose of precluding the gelation due to possible polymerization in the course of the reaction, it is desirable to use a conventional polymerization inhibitor. Examples of the polymerization inhibitor include hydroquinones such as methyl hydroquinone and hydroquinone and benzoquinones such as p-benzoquinone and p-toluquinone.

A ring-opening addition catalyst can be used for decreasing the reaction time. Examples of the ring-opening addition catalyst include water; alcohols such as methyl alcohol, ethyl alcohol, and isopropyl alchol; phenols such as phenol and t-butyl catechol; organic acids such as salicylic acid, citric acid, and malic acid; organic acid salts such as zinc salicylate and tin octylate; and boron trifluoride-monoethanolamine complex.

As an inert solvent, toluene, xylene, or dimethyl formamide can be used, for example. Such a catalyst as ethyl alcohol or acetic acid can be used in its unaltered form as a reaction medium. The solvent must be removed after the reaction. Particularly when a polymerizable cross-linking agent which is in a liquid state at normal room temperature is additionally used in the final composition, therefore, the polymerizable cross-linking agent can be diverted as a solvent.

The second method available for the production mentioned above comprises causing addition reaction of (s) the aromatic polyamine represented by the aforementioned formula or (t) the aromatic diamine represented by the aforementioned formula with an epihalohydrin (v) represented by the formula (8):

wherein $R^5$ stands for hydrogen atom or methyl group and Z for halogen atom, thereby preparing N-halohydrin as an intermediate, then dehydrohalogenating N-halohydrin with an alkali into a glycidyl thereby forming an epoxy compound (hereinafter referred to as "epoxy compound (V)"), and subjecting this epoxy compound to a ring-opening addition of acrylic acid and/or methacrylic acid.

The epihalohydrin (v) is a compound which is represented by the aforementioned formula. Examples of the epihalohydrin are epichlorohydrin, epibromohydrin, epiiodohydrin, β-methyl epichlorohydrin, β-methyl epibromohydrin, and β-methyl epiiodohydrin.

The reaction for the production of the epoxy compound (V) from (s) the aromatic polyamine or (t) the aromatic diamine and (v) the epihalohydrin can be carried out, for example, by combining (s) the aromatic polyamine or (t) the aromatic diamine with (v) the epihalohydrin in a ratio such that the proportion of (v) the epihalohydrin falls in the range of 1 to 5 equivalent weights, preferably 2 to 3 equivalent weights, per equivalent weight of the hydrogen atoms directly bonded to the nitrogen atoms in (s) the aromatic polyamine or (t) the aromatic diamine, heating the resultant mixture at temperautre in the range of 40° to 100° C. for a period of 5 to 30 hours, preferably at a temperature in the range of 70° to 90° C. for a period of 7 to 15 hours, for effecting an addition reaction, then gradually adding a hydroxide of an alkali metal to the reaction product, and heating the resultant mixture at a temperature not exceeding 70° C. for a period in the range of 2 to 10 hours for removal of hydrochloric acid.

As one example of (V) the epoxy compound, a product of Ciba-Geigy marketed under trademark designation of "Araldite MY-720" or a product of Toto Kasei marketed under trademark designation of "YH-434" can be used for the present invention.

The production of (a') the unsaturated ester compound or (b') the unsaturated ester compound by the reaction of (V) the epoxy compound with acrylic acid and/or methacrylic acid is accomplished, for example, by combining (V) the epoxy compound with acrylic acid and/or methacrylic acid in a ratio such that the proportion of acrylic acid and/or methacrylic acid falls in the range of 0.3 to 1.2 mols, preferably 0.5 to 1.1 mol, per mol of the epoxy group contained in (V) the epoxy compound, and heating the resultant mixture in an inert solvent or in the absence of solvent at a temperature in the range of 60° to 150° C., preferably 70° to 130° C., preferably in the presence of air. For the purpose of precluding the gelation due to possible polymerization in the course of the reaction, it is desirable to use a conventional polymerization inhibitor. Examples of the polymerization inhibitor include hydroquinones such as methyl hydroquinone and hydroquinone and benzoquinones such as p-benzoquinone and p-toluquinone.

For the purpose of decreasing the reaction time, it is desirable to use an esterification catalyst. Examples of the esterification catalyst are tertiary amines such as N,N-dimethyl aniline, pyridine, and triethyl amine and hydrochlorides and hydrobromides of such tertiary amines; quaternary ammonium salts such as tetramethyl ammonium chloride and triethylbenzyl ammonium chloride; sulfonic acids such as paratoluene sulfonic acid; sulfoxides such as dimethyl sulfoxide and methyl sulfoxide; sulfonium salts such as trimethyl sulfonium chloride and dimethyl sulfonium chloride; phosphines such as triphenyl phsophine and tri-n-butyl phosphine; and metal halides such as lithium chloride, lithium bromide, stannous chloride, and zinc chloride.

As an inert solvent, toluene or xylene may be used, for example. The solvent must be removed after the reaction. Particularly when a polyemrizable cross-linking agent which is in a liquid state at normal room temperature is additionally used in the final composition, therefore, it is desirable to convert this polymerizable cross-linking agent as a solvent.

Examples of (C') the polymerizable cross-linking agent to be used in the present invention include styrene and styrene derivatives such as methyl styrene, p-methyl styrene, t-butyl styrene, vinyl toluene, and divinyl benzene; (meth)acrylic ester monomers such as methyl (meth)acrylate, 2-ethylhexyl (meth)acrylate, cyclohexyl (meth)acrylate, tricyclodecenyl (meth)acrylate, and 2-hydroxyethyl (meth)acrylate; (meth)acrylates of polyhydric alcohols such as trimethylol propane tri(meth)acrayte, diethylene glycol di(meth)acrylate, 1,4-butane diol di(meth)acrylate, tris(2-hydroxyethyl) isocyanuric acid (meth)acrylic ester, and di(meth)acrylate of 2,2-bis[4-(2-hydroxyethoxy)phenyl]propane; and allyl compounds such as diallyl phthalate, diallyl isophthalate, diallyl terephthala&e, triallyl isocyanurate, and triallyl cyanurate which have been conventionally used for unsaturated polyester resins and vinyl ester resins in general. One member or a combination of two or more members suitably selected from the group can be used.

The mixing raito of (a') the unsaturated ester compound and/or (b') the unsaturated ester compound with (C') the polymerizable cross-linking agent is desired, from the standpoint of mechanical strength and thermal stability, to be such that the proportion of (a') the unsaturated ester compound and/or (b') the unsaturated ester compound falls in the range of 30 to 95 parts by weight, preferably 40 to 85 parts by weight, and the proportion of (C') the polymerizable cross-linking agent falls in the range of 70 to 5 parts by weight, preferably 60 to 15 parts by weight.

(II) The thiuram compound to be used in the present invention is a compound possessing at least one atomic group represented by the formula (4):

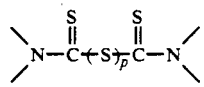

(4)

wherein p stands for an integer in the range of 1 to 8, preferably 1 to 4, in the molecular unit thereof. Thiuram compounds represented by the following formula (9):

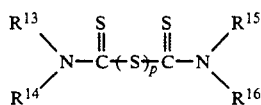

(9)

wherein p stands for an integer in the range of 1 to 8, preferably 1 to 4, $R^{13}$, $R^{14}$ and $R^{15}$ independently stand for alkyl groups of 1 to 4 carbon atoms or phenyl groups, and R16 stands for alkyl groups of 1 to 4 carbon. atoms, phenyl group, or

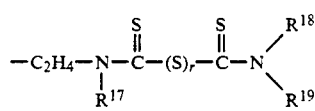

wherein r stands for an integer in the range of 1 to 8, preferably 1 to 4, $R^{17}$, $R^{18}$, and $R^{19}$ independently stand for alkyl groups of 1 to 4 carbon atoms, phenyl group, or

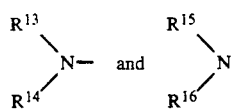

are formed heterocyclic rings are examples.

As typical examples of (II) the thiuram compound, there can be cited tetramethyl thiuram monosulfide, tetraethyl thiuram monosulfide, tetrabutyl thiuram monosulfide, bis(diethyleneoxyl) thiuram monosulfide, dipentamethylene thiuram monosulfide, bis(trimethyl thiuram monosulfide) ethylene, tetramethyl thiuram disulfide, tetraethyl thiuram disulfide, tetrabutyl thiuram disulfide, diphenyldimethyl thiuram disulfide, diphenyl diethyl thiuram disulfide, bis(diethyleneoxyl) thiuram disulfide, dipentamethylene thiuram disulfide, tetramethyl thiuram tetrasulfide, dipentamethylene thiuram tetrasulfide, tetramethyl thiuram trisulfide, tetramethyl thiuram hexasulfide, and bis(trimethyl thiuram disulfide) ethylene. These are not the only thiuram compounds available for the present invention. One member or a combination of two or more members suitably selected from the group can be used.

As examples of (III) the copper-containing compound to be used in combination with (II) the thiuram compound in the present invention, there can be cited organic acid salts such as copper acetate, copper citrate, copper oxalate, copper formate, copper naphthenate, copper oleate, copper acrylate, copper methacrylate, copper (2-hydroxyethyl) dithiocarbamate, and copper dimethyldithiocarbamate; chelate compounds such as copper acetyl acetonate; complex compounds such as a complex of cuprous chloride with triethyl phosphite and a complex of cupric chloride with dicyclohexyl sulfoxide; and inorganic salts such as cuprous chloride, cupric chloride, cuprous bromide, cupric bromide, cuprous oxide, cupric hydroxide, copper carbonate, copper nitrate, copper sulfate, copper phosphite, and cupric phosphate. These are not the only copper-containing compounds that are available for the present invention. One member or a combination of two or more members suitably selected from this group can be used.

In the impartation of storage stability to (I) the thermosetting resin composition, (II) the thiuram compound or (III) the copper-containing compound used alone is completely ineffective or only nominally effective. The conspicuous effect can never be attained as contemplated by the present invention unless (II) the thiuram compund and (III) copper-containing compound are simultaneously present.

The amounts of (II) the thiuram compound and (III) the copper-containing compound to be used herein are such that the proportion of (II) the thiuram compund falls in the range of 0.0001 to 2.0 parts by weight, preferably 0.001 to 0.5 part by weight, and the proportion of (III) the copper-containing compound as copper metal in the range of 0.00001 to 0.1 part by weight, preferably 0.0001 to 0.05 part by weight, based on 100 parts by weight of (I) the thermosetting resin composition. If the amount of (II) the thiuram compound to be used is less than 0.0001 part by weight, the effect is not sufficient even when (III) the copper-containing compound is used in a proper amount. Conversely if this amount exceeds 2.0 parts by weight, the effect is not increased proportionately to the excess involved. On the other hand, if the amount of (III) the copper-containing compound as copper metal is less than 0.00001 part by weight, the effect is not sufficient even when (II) the thiuram compound is used in a proper amount. If this amount exceeds 0.1 part by weight, the hindrance to polymerization during the course of curing of the resin composition becomes conspiquous and the cured product finally obtained is deficient in physical properties such as thermal stability and mechanical strength.

(II) The thiuram compound and (III) the copper-containing compound can be added to and combined with the thermosetting resin composition by various methods. For example, one method comprises adding as (III) the copper-containing compound an inorganic copper salt of relatively poor solubility in the resin composition at the outset of the preparation of (a), (b), (a'), or (b') the unsaturated ester compound and allowing the inorganic copper salt to be gradually dissolved during the course of the esterification reaction and, after the production of the aforementioned unsaturated ester compound, adding (II) the thiuram compound to be combined therewith and another method comprises simultaneously adding and combining (II) the thiuram compound and (III) the copper-containing compound during the formulation of the resin composition. Of course, the present invention is not restricted by the method of addition and combination of such compounds.

The method of this invention is not affected by the addition of such a conventional polymerization inhibitor as hydroquinone or benzoquinone besides (II) the thiuram compound and (III) the copper-containing compound which are indispensably used in the present invention.

By the method of the present invention, the problem of increased viscosity and gelation during the course of storage which is encountered by the resin composition of the maleimide compound-containing unsaturated ester type or the specific thermosetting resin composition containing (a') the unsaturated ester compound and/or (b') the unsaturated ester compound and (C') the polymerizable cross-linking agent can be readily eliminated. Consequently, the resin composition is enabled stably to provide cured products which excel in stability at elevated temperatures and in mechanical strength without any sacrifice of the outstanding formability such as curability and workability inherent in the resin composition. The method of the present invention, therefore, heightens to a conspicuous extent the practicability of the resin composition to which the conventional polymerization inhibitor, for example, has failed to impart satisfactory storage stability. The specific synergistic effect which the thiuram compound and the copper-containing compound manifest in the impartation of storage stability to the resin composition is surprisingly prominent.

The thermosetting resin composition of the present invention possesses high curability such that it can be cured very quickly by the photopolymerization or thermal polymerization and can be cured even at normal room temperature. Moreover, the cured product consequently obtained combines the highly desirably quality inherently manifested by the vinyl ester resins in terms of water resistance, chemical resistance, and mechanical strength with the characteristic property of retaining stability at elevated temperatures which none of the conventional heat-resistant resins has exhibited. Owing to these benefits, therefore, the resin composition of the present invention is suitable as the resin for the production of large formed articles of highly satisfactory stability at elevated temperatures by the contact pressure molding method or the filament winding method, as the resin for the production of formed articles excellent in stability at elevated temperatures by the continuous molding method of high productional efficiency such as the extrusion molding method, the draw molding method, or the continuous lamination molding method, and as the resin for the production of composite materials such as the resin for sheet molding compound (SMC) or bulk molding compound (BMC) featuring the shortness of molding cycle. As examples of the applications found for the resin, there can be cited corrosion-proof articles such as tanks, pipes, ducts, and scrabbers, automobile parts such as leaf springs, drive shafts, and wheels, electric and electronic parts such as printed-circuit boards and various insulating components, and sheaths for optical fibers.

Now, the present invention will be described more specifically below with reference to Referential Examples, working Examples, and Controls. It should be noted, however, that this invention is not limited to the working examples. Wherever parts and percents (%)

are mentioned hereinafter, they shall be construed invariably as those by weight.

REFERENTIAL EXAMPLE 1

In a reaction vessel provided with a thermometer, a reflux condenser, and air blow pipe, and a stirrer, 88 parts of methacrylic acid, 227 parts of cresol novolak epoxy resin having an epoxy equivalent weight of 227 and containing an average of 5.1 epoxy groups in the molecular unit thereof (produced by Ciba-Geigy and marketed under product code of "ECN-1280"), 130 parts of vinyl toluene, 0.34 part of hydroquinone, and 1.30 parts of triethyl amine were placed and stirred and heated at 115° C. under a current of air for eight hours to produce an unsaturated ester of an acid number of 5 in the form of a solution in vinyl toluene. By combining this unsaturated ester with 127 parts of vinyl toluene, there was obtained an unsaturated ester resin (a). A resin composition (1) was produced by mixing 100 parts of the unsaturated ester resin (a) with 20 parts of N-cyclohexyl maleimide.

REFERENTIAL EXAMPLE 2

In the same reaction vessel as used in Referential Example 1, 103 parts of phenol novolak (having a softening point of 85° C. and OH equivalent weight of 103), 142 parts of glycidyl methacrylate, 66 parts of styrene, 0.2 part of methyl hydroquinone, and 0.85 part of triethyl amine were placed and stirred and heated at 115° C. under a current of air for eight hours. After the reaction product was analyzed by the nuclear magnetic resonance absorption spectrometry to confirm thorough reaction of glycidyl methacrylate therein, it was combined with 90 parts of styrene and 45 parts of tris(2-hydroxyethyl)isocyanuric acid acrylic ester to form an unsaturated ester resin (b). A resin composition (2) was obtained by mixing 100 parts of the unsaturated ester resin (b) with 15 parts of N-phenyl maleimide.

REFERENTIAL EXAMPLE 3

In the same reaction vessel as used in Referential Example 1, 88 parts of methacrylic acid, 185 parts of bisphenol type epoxy resin having an epoxy equivalent weight of 185 (produced by Ciba-Geigy and marketed under trademark designation of "Araldite GY250"), 0.084 part of hydroquinone, 0.024 part of cuprous chloride, and 1.0 part of triethyl amine were placed and stirred and heated at 115° C. under a current of air for six hours to form an unsaturated ester having an acid number of 7. An unsaturated ester resin (c) was obtained by mixing 55 parts of this unsaturated ester with 35 parts of p-methyl styrene and 10 parts of trimethylol propane trimethacrylate A resin composition (3) was obtained by mixing 100 parts of the unsaturated ester resin (c) with 25 parts of N-cyclohexyl maleimide.

EXAMPLES 1 through 3

A thiuram compound and a copper-containing compound indicated in Table 1 were added in amounts similarly indicated in the table to 100 parts of the resin composition (1). Then, 1 kg of the resin composition consequently obtained was placed in a can of tin plate having an inner volume of 1 liter, sealed tightly therein, and stored at a temperature of 40° C.. The resin composition, after the storage, was visually examined. The results were as shown in Table 1.

CONTROLS 1 through 3

Resin compositions for comparison were prepared by following the procedure of Exmaples 1 through 3, except that neither a thiuram compound nor a copper-containing compound was added, a thiuram compound alone was added, and a copper-containing compound alone was added instead, respectively to 100 parts of the resin composition (1). The resultant resin compositions, similarly to those of Examples 1 through 3, were tightly sealed in cans of tin plate and stored at 40° C.. The resin compositions, after the storage, were visually examined. The results are also shown in Table 1.

TABLE 1

|  | Thiuram compound | | Copper-containing compound | | State after storage at 40° C. |
|---|---|---|---|---|---|
|  | Name | Amount (part) | Name | Amount as copper metal (part) |  |
| Example 1 | Tetramethyl thiuram monosulfide | 0.10 | Copper naphthenate | 0.0025 | No abnormality even after 50 days (Note 1) |
| Example 2 | Tetramethyl thiuram disulfide | 0.15 | Copper salicylate | 0.0030 | No abnormality even after 50 days (Note 1) |
| Example 3 | Dipentamethylene thiuram monosulfide | 0.50 | Copper naphthenate | 0.0015 | No abnormality even after 50 days (Note 1) |
| Control 1 | Non added |  | Non added |  | Gelation occurred after 3 days |
| Control 2 | Tetramethyl thiuram monosulfide | 0.10 | Non added |  | Gelation occurred after 3 days |
| Control 3 | Non added |  | Copper naphthenate | 0.0025 | Gelation occurred after 4 days |

(Note 1) Neither conspicuous increase of viscosity nor phenomenon of gelation was observed at all in the resin composition.

EXAMPLES 4 through 6

A thiuram compound and a copper-containing compound indicated in Table 2 were added in amounts indicated similarly in the table to 100 parts of the resin composition (2). The resultant resin compositions, similarly to those of Examples 1 through 3, were tightly sealed in cans of tin plate and stored at 40° C.. The results of the visual examination of the resin composition after the storage are shown in Table 2.

CONTROLS 4 through 6

Resin compositions for comparison were prepared by following the procedure of Examples 4 through 6, except that neither a thiuram compound nor a copper-containing compound was added, a thiuram compound alone was added, and a copper-containing compound alone was added, respectively to 100 parts of the resin composition (2). The resultant resin compositions, similarly to those of Examples 4 through 6, were tightly sealed in cans of tin plate and stored at 40° C. The results of the visual examination of the resin composition after the storage are shown in Table 2.

TABLE 2

| | Thiuram compound | | Copper-containing compound | | |
|---|---|---|---|---|---|
| | Name | Amount (part) | Name | Amount as copper metal (part) | State after storage at 40° C. |
| Example 4 | Tetramethyl thiuram monosulfide | 0.20 | Complex of cuprous chloride and triethyl phosphite | 0.0040 | Gelation occurred after 31 days |
| Example 5 | Tetrabutyl thiuram disulfide | 0.20 | Copper acrylate | 0.0020 | Gelation occurred after 25 days |
| Example 6 | Tetramethyl thiuram monosulfide | 0.15 | Copper diethyl dithiocarbamate | 0.0015 | Gelation occurred after 24 days |
| Control 4 | Non added | | Non added | | Gelation occurred after 2 days |
| Control 5 | Tetramethyl thiuram monosulfide | 0.20 | Non added | | Gelation occurred after 2 days |
| Control 6 | Non added | | Complex of cuprous chloride and triethyl phosphite | 0.0040 | Gelation occurred after 4 days |

EXAMPLES 7 THROUGH 9

A thiuram compound indicated in Table 3 was added in an amount indicated similarly in the table to 100 parts of the resin composition (3) (with cuprous chloride already added as a copper-containing compound during the synthesis of the unsaturated ester). The resin compositions consequently obtained were tightly sealed in the same can of tin plate as in Examples 1 through 3 and stored at 40° C. The results of the visual examination of the resin compositions after the storage are shown in Table 3.

CONTROL 7

For comparison, 100 parts of the resin composition (3) was tightly sealed in the same can of tin plate and stored at 40° C. The results of the visual examination of the resin composition after the storage are shown in Table 3.

TABLE 3

| | Thiuram compound | | Copper-containing compound | | |
|---|---|---|---|---|---|
| | Name | Amount (part) | Name | Amount as copper metal (part) | State after storage at 40° C. |
| Example 7 | Tetraethyl thiuram disulfide | 0.20 | Cuprous chloride | 0.0025 | Gelation occurred after 45 days |
| Example 8 | Tetramethyl thiuram monosulfide | 0.15 | Cuprous chloride | 0.0025 | No abnormality even after 50 days (Note 1) |
| Example 9 | Dimethyldiphenyl thiuram monosulfide | 0.15 | Cuprous chloride | 0.0025 | No abnormality even after 50 days (Note 1) |
| Control 7 | Non added | | Cuprous chloride | 0.0025 | Gelation occurred after 4 days |

(Note 1) Neither conspicuous increase of viscosity nor phenomenon of gelation was observed at all in the resin composition.

REFERENTIAL EXAMPLE 4

In a reaction vessel provided with a thermometer, a reflux condenser, an air blow pipe, and a stirrer, 128 parts of glycidyl methacrylate, 59 parts of polymethylene polyaniline represented by the following formula:

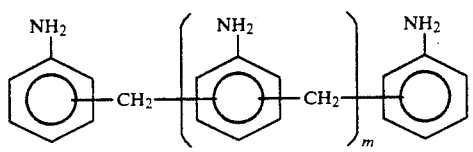

wherein the average value of m is 0.8, (having an amino content of 15.8%, product of Mitsui-Toatsu Chemicals Inc. marketed under product code of "MDA-150"), 75 parts of vinyl toluene, 0.3 part of methyl hydroquinone, and 0.45 part of zinc salicylate were placed and stirred and heated at 110° C. under a current of air for eight hours until thorough conversion of glycidyl methacrylate in the reaction product was confirmed by the nuclear magnetic resonance absorption spectrometry, to produce a solution of unsaturated ester compound in vinyl toluene. A resin composition (4) was obtained by mixing the reaction product with 25 parts of vinyl toluene.

REFERENTIAL EXAMPLE 5

In the same reaction vessle as used in Referential Example 4, 71.2 parts of 2,2-bis[4-(4-aminophenoxy)-phenyl]propane, 78.8 parts of glycidyl methacrylate, 80 parts of p-methyl styrene, 0.2 part of methyl hydroquinone, and 0.5 part of triethyl amine were placed and stirred and heated 115° C. under a current of air for five hours until thorough conversion of glycidyl methacrylate in the reaction product was confirmed by the nuclear magnetic resonance absorption spectrometry, to produce a resin composition (5).

REFERENTIAL EXAMPLE 6

In the same reaction vessel as used in Referential Example 4, 73 parts of methacrylic acid, 125 parts of N-tetraglycidyl diamino diphenyl methane having an epoxy equivalent weight of 125 (produced by Ciba-Geigy and marketed under trademark designation of "Araldite MY 720"), 50 parts of styrene, 0.16 part of toluquinone, and 0.65 part of triethyl amine were placed and stirred and heated at 115° C. under a current of air for six hours, to obtain an unsaturated ester compound having an acid number of 3.0 in the form of a solution in styrene. A resin composition (6) was obtained by mixing this styrene solution with 57 parts of vinyl toluene.

EXAMPLES 10 THROUGH 12

A thiuram compound and a copper-containing compound indicated in Table 4 were added in amount indicated similarly in the table to 100 parts of the resin composition (4). Then, the resultant resin composition, each in a fixed amount of 1 kg, were tightly sealed in cans of tin plate having an inner volume of 1 liter and stored at 40° C. The resin composition, after the storage, were visually examined. The results are shown in Table 4.

CONTROLS 8 THROUGH 10

Resin composition for comparison were obtained by following the procedure of Examples 10 through 12, except that neither a thiuram compound nor a copper-containing compound was added, a thiuram compound alone was added, and a copper-containing compound alone was added instead, respectively to 100 parts of the resin composition (4). The resultant resin compositions were tightly sealed in cans of tin plate and stored at 40° C., similarly to those of Examples 10 through 12. The results of the visual examination of the resin compositions after the storage are shown in Table 4.

TABLE 4

| | Thiuram compound | | Copper-containing compound | | |
|---|---|---|---|---|---|
| | Name | Amount (part) | Name | Amount as copper metal (part) | State after storage at 40° C. |
| Example 10 | Tetrabutyl thiuram disulfide | 0.20 | Copper salicylate | 0.0005 | No abnormality even after 50 days (Note 1) |
| Example 11 | Dipentamethylene thiuram disulfide | 0.20 | Copper naphthenate | 0.0030 | No abnormality even after 50 days (Note 1) |
| Example 12 | Tetramethyl thiuram monosulfide | 0.10 | Copper naphthenate | 0.0015 | No abnormality even after 50 days |
| Control 8 | Non added | | Non added | | Gelation occurred after 3 days |
| Control 9 | Tetramethyl thiuram monosulfide | 0.10 | Non added | | Gelation occurred after 4 days |
| Control 10 | Non added | | Copper naphthenate | 0.0015 | Gelation occurred after 4 days |

(Note 1) Neither conspicuous increase of viscosity nor phenomenon of gelation was observed at all in the resin composition.

EXAMPLES 13 THROUGH 15

A thiuram compound and a copper-containing compound indicated in Table 5 were added in amounts indicated similarly in table to 100 parts of the resin composition (5). Then, the resultant resin compositions were tightly sealed in cans of tin plate and stored at 40° C., similary to those of Examples 10 through 12. The results of the visual examination of the resin compositions after the storage are shown in Table 5.

CONTROLS 11 THROUGH 13

Resin compositions for comparison were prepared by following the procedure of Examples 10 through 12, except that neither a thiuram compound nor a copper-containing compound was added, a thiuram compound alone was added, and a copper-containing compound alone was added instead, respectively to 100 parts of the resin composition (5). The resultant resin compositions were tightly sealed in cans of tin plate and stored at 40° C., similarly to those of Examples 10 through 12. The results of the visual examination of the resin compositions after the storage are shown in Table 5.

TABLE 5

| | Thiuram compound | | Copper-containing compound | | |
|---|---|---|---|---|---|
| | Name | Amount (part) | Name | Amount as copper metal (part) | State after storage at 40° C. |
| Example 13 | Tetramethyl thiuram monosulfide | 0.10 | Complex of cuprous chloride and triethyl phosphite | 0.002 | No abnormality even after 50 days (Note 1) |
| Example 14 | N,N'-dimethyl-N,N'-diphenyl thiuram disulfide | 0.20 | Copper acrylate | 0.005 | No abnormality even after 50 days (Note 1) |
| Example 15 | Tetraethyl thiuram disulfide | 0.10 | Copper naphthenate | 0.0025 | No abnormality even after 50 days (Note 1) |
| Control 11 | Non added | | Non added | | Gelation occurred after 3 days |
| Control 12 | Tetraethyl thiuram disulfide | 0.10 | Non added | | Gelation occurred after 3 days |
| Control 13 | Non added | | Copper naphthenate | 0.0025 | Gelation occurred after 5 days |

(Note 1) Neither conspicuous increase of viscosity nor phenomenon of gelation was observed at all in the resin composition.

EXAMPLES 16 THROUGH 18

A thiuram compound and a copper-containing compound indicated in Table 6 were added in amounts similarly indicated in the table to 100 parts of the resin composition (6). The resultant resin compositions were tightly sealed in cans of tin plate and stored at 40° C. The results of the visual examination of the resin compositions after the storage are shown in Table 6.

CONTROLS 14 THROUGH 16

Resin compositions for comparison were prepared by following the procedure of Examples 10 through 12, except that neither a thiuram compound nor a copper-containing compound was added, a thiuram compound alone was added, and a copper-containing compound alone was added instead in amounts similarly indicated in the table, respectively to 100 parts of the resin composition (6). The resultant resin compositions were tightly sealed in cans of tin plate and stored at 40° C. similarly to those of Examples 10 through 12. The results of the visual examination are shown in Table 6.

TABLE 6

| | Thiuram compound | | Copper-containing compound | | |
|---|---|---|---|---|---|
| | Name | Amount (part) | Name | Amount as copper metal (part) | State after storage at 40° C. |
| Example 16 | Tetrabutyl thiuram disulfide | 0.05 | Copper naphthenate | 0.01 | No abnormality even after 50 days (Note 1) |
| Example 17 | Dipentamethylene thiuram tetrasulfide | 0.2 | Copper acetate | 0.002 | No abnormality even after 50 days (Note 1) |
| Example 18 | Dipentamethylene thiuram monosulfide | 0.1 | Copper salicylate | 0.003 | No abnormality even after 50 days (Note 1) |
| Control 14 | Non added | | Non added | | Gelation occurred after 3 days |
| Control 15 | Dipentamethylene thiuram monosulfide | 0.1 | Non added | | Gelation occurred after 3 days |
| Control 16 | Non added | | Copper salicylate | 0.003 | Gelation occurred after 5 days |

(Note 1) Neither conspicuous increase of viscosity nor phenomenon of gelation was observed at all in the resin composition.

APPLIED EXAMPLES 1 THROUGH 18

The resin compositions obtained in Examples 1 through 18, each in a fixed amount of 100 parts, were thoroughly mixed severally with 1 part of t-butyl peroxy-2-ethylhexanoate to produce sample mixtures. Square of 20 cm of stain-weave glass cloth (produced by Nihon Glass Fiber Kabushiki Kaisha and marketed under product code of "YES-2101-N-1") were impregnated with a given sample mixture. A total of 12 impregnated squares were laminated and pressed under 130 kg/cm² at 120° C. for three minutes, to produce a laminate having a glass content of 65±1% and a thickness of 3 mm. The laminates thus obtained were heated for after cure in an air oven at 180° C. for one hour and put to test for thermal stability.

The results of the test are shown in Table7.

The evaluation of thermal stability was carried out by using test pieces 75 mm×25 mm×3 mm cut from the laminate, heating the test pieces to find the ratio of decrease of weight by heating and the ratio of bending strength retained after the heating, and calculating the following formula using the results of the measurement.

The bending strength was determined in accordance with JIS K6911.

Ratio of decrease of weight by heating (%) =

$$\frac{\text{(Weight of test piece after heating in air at 240° C. for 500 hours)} - \text{(Weight of glass fibers in test Piece)}}{\text{(Weight of test piece at the start of heating)} - \text{(Weight of glass fibers in test piece)}} \times 100$$

The weight of glass fibers mentioned above was determined by heating the test piece in the air at 240° C. for 500 hours and further heating the test piece at 600° C. for five hours and thereafter taking weight of the test piece.

Ratio of bending strength retained (%) =

$$\frac{\text{Bending strength after 500 hours' heating in the air at 240° C.}}{\text{Initial bending strength}} \times 100$$

TABLE 7

| Applied Example | composition used | Ratio of decrease of weight after 500 hours' heating in the air at 240° C. (%) | Ratio of bending strength retained after 500 hour' heating in the air at 240° C. (%) |
|---|---|---|---|
| 1 | Example 1 | 3.0 | 93 |
| 2 | Example 2 | 2.9 | 93 |
| 3 | Example 3 | 3.9 | 94 |
| 4 | Example 4 | 9.5 | 78 |
| 5 | Example 5 | 9.8 | 76 |
| 6 | Example 6 | 9.6 | 76 |
| 7 | Example 7 | 12.9 | 67 |
| 8 | Example 8 | 12.9 | 68 |
| 9 | Example 9 | 12.8 | 68 |
| 10 | Example 10 | 8.0 | 97 |
| 11 | Example 11 | 8.1 | 98 |
| 12 | Example 12 | 8.0 | 98 |
| 13 | Example 13 | 8.0 | 97 |
| 14 | Example 14 | 7.9 | 97 |
| 15 | Example 15 | 8.0 | 97 |
| 16 | Example 16 | 11.5 | 80 |
| 17 | Example 17 | 11.8 | 78 |
| 18 | Example 18 | 11.9 | 75 |

What is claimed is:

1. A thermosetting resin composition of high storage stability, comprising:
(I) 100 parts by weight of a thermosetting resin composition comprising:
(A') (b') 30 to 95% by weight of an unsaturated ester compound represented by the formula (3):

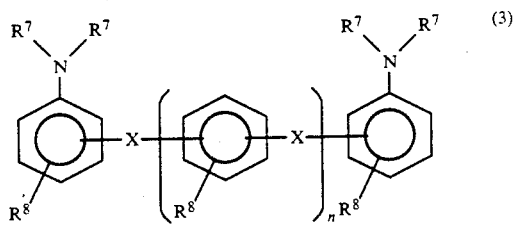

wherein $R^7$'s independently selected from the group consisting of

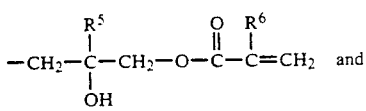

and

-continued

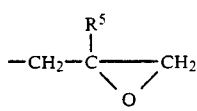

wherein $R^5$ and $R^6$ independently stand for hydrogen atom or methyl group, and hydrogen atom, at least one of $R^7$'s stands for

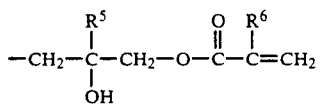

wherein $R^5$ and $R^6$ have the same meanings as defined above, $R^8$'s stand for at least one member selected from the group consisting of hydrogen atom, halogen atoms, methoxy group, and alkyl groups of 1 to 5 carbon atoms, and n stands for O or an integer in he range of 1 to 10, providing that X stands for a divalent organic group selected from the group consisting of

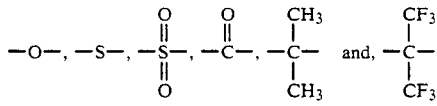

wherein n is O, or X's stand for divalent organic groups independently selected from the group consisting of

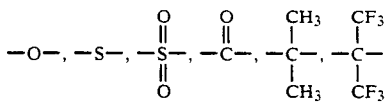

and $-CH_2-0$ where n is an integer in the range of 1 to 10, and (C') 70 to 5% by weight of polymerizable cross-linking agent, (II) 0.0001 to 2.0 parts by weight of a thiuram compound possessing at least one atomic group represented by the general formula (4):

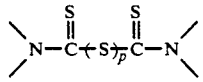 (4)

wherein p stands for an integer in the range of 1 to 8, in the molecular unit thereof, and (III) 0.00001 to 0.1 part by weight (as copper metal) of a copper-containing compound.

2. A resin composition according to claim 1 wherein (I) said thermosetting resin composition comprises 40 to 85% by weight of an unsaturated ester compound and 15 to 60% by weight of polymerizable cross-linking agent.

3. A resin composition according to claim 1 wherein (II) said thiuram compound is incorporated in an amount in the range of 0.001 to 0.5 part by weight and (III) said copper-containing compound in an amount in the range of 0.0001 to 0.05 part by weight (as copper metal), based on (I) 100 parts by weight of said thermosetting resin composition.

4. A resin composition according to claim 1 wherein p in said general formula (4) is an integer in the range of 1 to 4.

* * * * *